(12) United States Patent
Collryd et al.

(10) Patent No.: US 10,887,493 B2
(45) Date of Patent: Jan. 5, 2021

(54) CAMERA ASSEMBLY HAVING A COOLING ARRANGEMENT

(71) Applicant: Axis AB, Lund (SE)

(72) Inventors: Stefan Collryd, Lund (SE); Andreas Hertzman, Lund (SE); Malte Bokvist, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/354,726

(22) Filed: Mar. 15, 2019

(65) Prior Publication Data
US 2019/0312994 A1 Oct. 10, 2019

(30) Foreign Application Priority Data
Apr. 10, 2018 (EP) ..................... 18166589

(51) Int. Cl.
*H04N 5/225* (2006.01)
*G03B 17/55* (2006.01)
*G09G 5/00* (2006.01)

(52) U.S. Cl.
CPC ........... *H04N 5/2252* (2013.01); *G03B 17/55* (2013.01); *G09G 5/00* (2013.01); *H04N 5/2251* (2013.01); *H04N 5/2258* (2013.01)

(58) Field of Classification Search
CPC ...................... H04N 5/225–2254; G03B 17/55
USPC .................................................. 348/373–376
See application file for complete search history.

(56) References Cited

U.S. PATENT DOCUMENTS

| | | |
|---|---|---|
| 4,320,949 A | 3/1982 | Pagano |
| 9,025,031 B2 | 5/2015 | Murphy et al. |
| 2004/0169771 A1* | 9/2004 | Washington ......... H04N 5/2253 348/374 |
| 2005/0213960 A1* | 9/2005 | Baldwin ................ G03B 29/00 396/439 |
| 2012/0154521 A1 | 6/2012 | Townsend et al. |
| 2014/0063334 A1* | 3/2014 | McBride .............. H04N 5/2252 348/373 |
| 2014/0184835 A1* | 7/2014 | Nozawa ............... H04N 5/2252 348/208.3 |
| 2017/0131621 A1* | 5/2017 | Tang .................... G03B 15/006 |
| 2017/0205686 A1* | 7/2017 | Bingleman ............ G03B 17/08 |
| 2017/0269650 A1* | 9/2017 | Kilgore ................ H04N 5/2257 |
| 2018/0220548 A1* | 8/2018 | Onuchin ............ H04N 5/23238 |

(Continued)

FOREIGN PATENT DOCUMENTS

| | | |
|---|---|---|
| EP | 2887328 A1 | 6/2015 |
| JP | 9172564 A | 6/1997 |

(Continued)

OTHER PUBLICATIONS

Extended European Search Report dated Sep. 28, 2018 for the European Patent Application No. 18166589.4.

*Primary Examiner* — Anthony J Daniels
(74) *Attorney, Agent, or Firm* — Volpe Koenig

(57) ABSTRACT

A camera assembly includes a housing and a transparent dome, and it is configured to receive at least one camera head arranged in the housing, inside the transparent dome. The housing comprises a cooling arrangement having a heat dissipation portion arranged within the housing and extending through the dome, and the heat dissipation portion is made from a material configured to transfer heat efficiently. Furthermore, the cooling arrangement comprises a channel for airflow.

13 Claims, 2 Drawing Sheets

(56) References Cited

U.S. PATENT DOCUMENTS

| | | | | |
|---|---|---|---|---|
| 2018/0241915 A1* | 8/2018 | Guan | ...................... | G03B 37/04 |
| 2018/0259832 A1* | 9/2018 | Chen | .................... | H04N 5/2252 |
| 2018/0302566 A1* | 10/2018 | Wada | .................... | H04N 5/2253 |
| 2019/0020800 A1* | 1/2019 | Fujii | .................. | H04N 5/22521 |
| 2019/0239383 A1* | 8/2019 | Kim | ................. | G08B 13/19634 |

FOREIGN PATENT DOCUMENTS

| | | |
|---|---|---|
| WO | 00/04720 A1 | 1/2000 |
| WO | 2005/048586 A1 | 5/2005 |
| WO | 2015/063890 A1 | 5/2015 |

* cited by examiner

CAMERA ASSEMBLY HAVING A COOLING ARRANGEMENT

TECHNICAL FIELD

The present invention relates to a camera assembly and in particular a camera assembly having a cooling arrangement.

TECHNICAL BACKGROUND

Within the context of surveillance cameras use is often made of standalone units comprising one or more camera heads and associated electronics. Surveillance cameras may be arranged in exposed environments in terms of water, moisture, dust, etc., and it may also be of interest to protect camera heads from being affected detrimentally by physical actions, such as criminal damage (vandalism) or from impacts of a more accidental nature. For these reasons it is generally preferred to arrange the camera head or camera heads within a protective housing. Such protective housing typically comprises a chassis in which the electronics and camera heads are arranged, and transparent portion, such as a dome or window. The purpose of the transparent portion is of course to allow transmission of radiation of interest for sensors of the camera head or camera heads, and as such the properties may be altered (by choice of materials or coatings) depending on the desired transmission properties. Furthermore, the properties of the housing may vary depending on intended use, ranging from a dust protection to various IP-classifications, explosion protection, etc. There are numerous examples of such housings, provided separately or as a designated part of a camera assembly, commercially available.

An effect of the housing is that the camera head(s) will be located in a confined space, and that the heat generated during operation will be confined as well. Excessive heat is a feature that is to be avoided when operating imaging sensors, e.g. CMOS sensors, since it will result in an increase in the noise generated by the system. Theoretically, the thermal noise is a white noise that affects all frequencies and all pixels of the imaging system, and as such it will obscure the signal of interest, which in an imaging situation may correspond to finer details in a field of view of the camera head. Thermal noise will always affect the image in a detrimental way, yet it becomes increasingly negative as the overall signal decreases, e.g. during imaging in low-light situations.

Known and obvious ways to alleviate the issue of heat is to introduce cooling arrangements, such as cooling fins or water cooling, as well as to minimize the effect by moving the heat generating electronics (the processors) as far from the image sensors as possible. Several of the suggested actions result in an increased complexity during installation or a design that could be perceived as too bulky in some situations.

The present disclosure provides an improved cooling arrangement, tailormade for a specific group of camera assemblies.

SUMMARY

According to a first aspect, a camera assembly comprising an improved cooling arrangement is provided. The camera assembly has a housing, a transparent dome, and it is configured to receive at least one camera head arranged in the housing, inside the transparent dome. The housing comprises a cooling arrangement having a heat dissipation portion arranged within the housing and extending through the dome, wherein the heat dissipation portion is made from a material configured to transfer heat efficiently, and wherein the cooling arrangement comprises a channel for airflow. Capturing the generated heat inside the camera assembly and efficiently transferring it to an airflow leading out from the assembly enables an efficient cooling and an increased flexibility in the design of the assembly. It also enables for the heat dissipation portion to be a structural part of the assembly, and in that way the number of components may be minimized.

In one or more embodiments, the heat dissipation portion also constitutes a physical barrier between the channel and a compartment where said at least one camera head is arranged. This means that any interfaces between other components should be adequately sealed.

It is preferred that the heat dissipation portion, in one or several embodiments, extends to a chassis of the housing, to enable, e.g., a rigid construction, beneficial heat conduction properties and an adequate seal to the camera compartment.

Furthermore, the channel may extend to or through the chassis, and continue as a manifold extending outwards towards a perimeter of the housing. The design of the manifold may be such that it directs the flow of air over surfaces expected to be heated by heat-generating components.

For the same purpose, the chassis may be made from a material configured to transfer heat efficiently.

To further improve the cooling performance, the heat dissipation portion may comprise a fitting for a processing unit of the camera assembly. In this way the processing unit may be in direct contact with the very component used for dissipating the generated heat.

In one or more embodiments, a fan may arranged in the heat dissipation portion in order to enhance the airflow. The fan is preferably powered directly from a power unit of the camera assembly, yet another power source may be utilized as well. The fan may be used to enhance the convective flow being generated by the heated air, yet it may also be used to reverse the direction of the air flow. This may be preferential in some applications where an airflow in the vicinity of the dome is not desired.

In one or more embodiments, the inlet of the channel may be arranged at a center of the camera assembly, and wherein an outlet of the channel may be arranged at a perimeter of the assembly. "Inlet" and "outlet" refers to the normal, or expected, flow direction. The flow could be reversed, either by natural causes, such as a strong draft or an unexpected temperature profile in the channel, or by the use of a fan. In that sense the "inlet" and "outlet" may instead be referred to as a first and a second opening of the channel, yet inlet and outlet are considered to cover most applications.

In applications where the surrounding air is believed to be detrimental to the cooling channel or components therein (mainly the fan), an exchangeable filter unit may be arranged near an inlet of the channel.

In order to facilitate the service of the cooling arrangement, the upper part of the heat dissipation portion, at an end of the heat dissipation portion extending through the dome, may be removable for access to the interior of the heat dissipation portion.

Furthermore, since the exchangeable filter may be a component requiring periodical replacement it could be preferable to simplify the access to the filter even more. This may be accomplished if the removable upper part of the heat dissipation portion comprises a cap below which the removable filter may be arranged. The cap may be pressed into place, or it may comprise an exterior threading fitting matingly with a threading of an opening in the removable upper part.

The removable upper part may be held in place towards the rest of the heat dissipation portion by means of a pressure exerted by the dome.

Additionally, a camera assembly of the disclosed type may comprise multiple camera heads, such as 2, 3, 4, 5, or more.

DETAILED DESCRIPTION OF EMBODIMENTS

Figure 1:
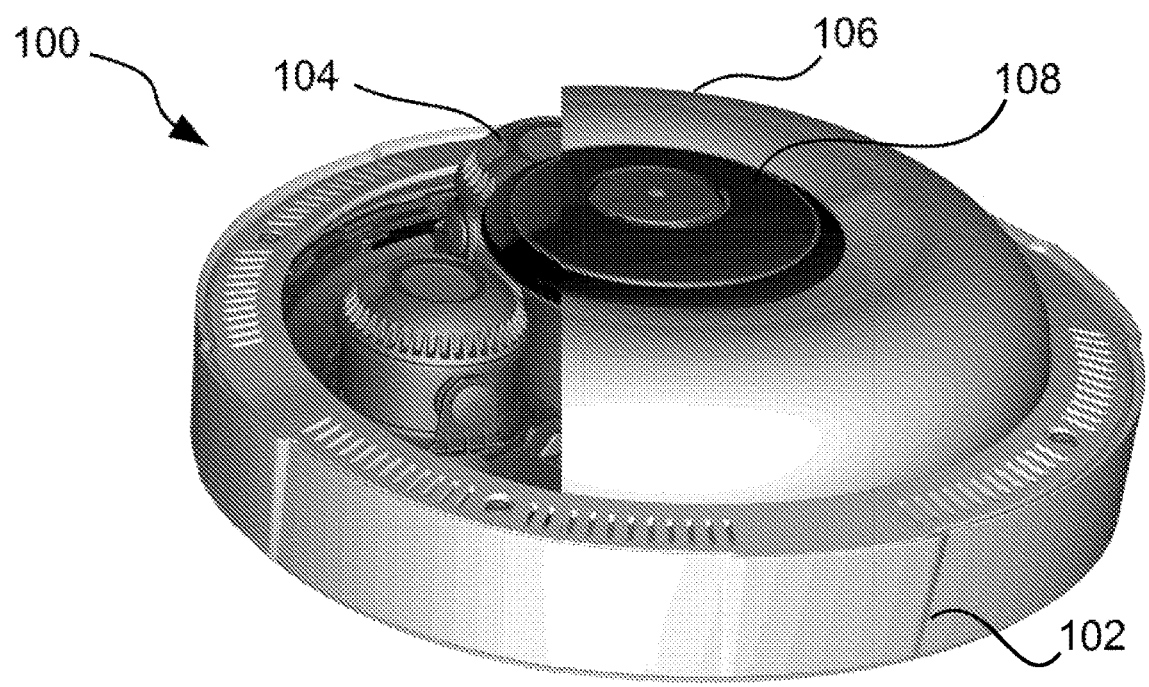
FIG. 1 is a perspective, partly cutaway, view of a camera assembly having a cooling arrangement according to one embodiment thereof.

A camera assembly 100, in which the present teachings may be embodied, is illustrated in the perspective view of FIG. 1. The camera assembly 100 comprises a housing 102, one or more camera heads 104, and a transparent dome 106. A similar version of such a camera assembly is disclosed in EP2887328, by the present applicant.

Part of the transparent dome 106 has been cutaway so some camera heads 104 are clearly visible. A central part 108 of the assembly may comprise connectors, control units etc. (not shown), for receiving, processing and forwarding the result of the imaging effected by the camera heads 104. The central part 108 will in this embodiment comprise the cooling arrangement, or at least a portion thereof, and we will return to that. First, two things may be noted to increase the understanding of the present illustrated camera assembly 100; each of the individually mentioned portions may in fact comprise several parts, e.g. the "housing 102" may comprise a base, a chassis, a bracket, several covers etc. Furthermore, these parts may be manufactured from different materials (or the same material). Since these individual parts are not considered essential for understanding or enabling the present teachings a detailed description of them is not provided herein. However, further information is readily found by observing commercially available products, e.g. from the present applicant. The other thing is that in the illustrated view the camera assembly 100 is basically upside-down as compared to a normal installation where the camera assembly is attached to a ceiling or mounting base with the camera heads 104 facing down and to the sides to surveil a designated area.

Figure 2:
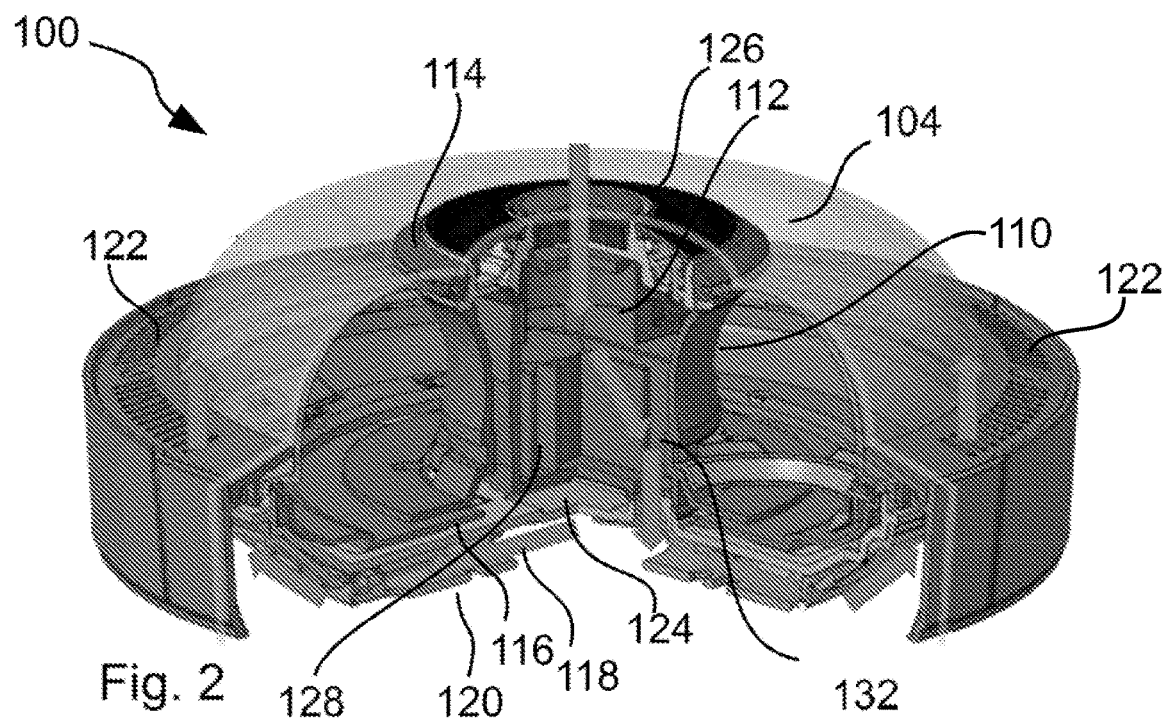
FIG. 2 is a sectional view, with a 90-degree section removed, illustrating an example of an airflow through a cooling arrangement according to one embodiment thereof.

Returning now to the central part 108, it will contain a portion of the cooling arrangement, an embodiment of which is most readily explained referring to FIG. 2. The most prominent part is the heat dissipation portion 110 extending essentially from a top to a bottom of the camera assembly 100. The heat dissipation portion provides a physical barrier between a compartment configured to house the camera head(s) and a channel 112 extending through the heat dissipation portion. Furthermore, the heat dissipation portion has a flange or surface for receiving a seal configured to seal off the contact area between the dome 104 and the heat dissipation portion. Further constructional details may be involved in the seal arrangement 114.

The heat dissipation portion may be made from a material with good properties in regard to heat conduction, such that it transports heat efficiently. It may also be noted that the heat dissipation portion is a structural part of the camera assembly, adding to its functionality.

If the heat dissipation portion should be coated, using electro deposition is preferred over e.g., powder coating in order to maintain the thermal conductivity. However, powder coating or other surface treatments may be conceivable depending on the application. The properties of transporting heat efficiently could also be provided in a more elaborate manner, which also would be acceptable from a functional viewpoint, though such a more elaborate solution would be likely to incorporate a higher cost. Such more elaborate solutions could correspond to using heat pipes. A more low-tech solution is to use a material having a higher thermal conductivity, such as copper, which would have an effect on cost of the device.

In general, parts may be manufactured from different materials (or the same material) depending on the desired properties. Parts that should have increased rigidity or heat conducting properties (such as may be the case for portions of the housing, in particular the chassis thereof, as well as the bracket) could be made of, e.g., aluminum. Suitable processes for applying a color to such parts may be powder coating or electro deposition, as already mentioned. Other parts may be made from colored plastics, and the transparent dome may be made from, e.g., acrylic or polycarbonate.

The physical barrier provided allows for outside air to access the channel without any direct impact on the camera head compartment. The heat dissipation portion 110 is attached to the housing at the chassis 116, and the channel 112 extends into a manifold 118 between the chassis 116 and the bracket 120 of the housing 102. In the illustrated embodiment, the manifold 118 extends to peripheral edges of the housing, and exits through an outlet arrangement 122 provided in the housing. As such, the outlet arrangement will result in a flow of air over some surfaces of the dome, which may reduce contamination from the surrounding air, in particular if the air used for cooling is filtered.

In the illustrated embodiment the outlet is embodied as a vent arrangement 122, yet the shape, size and position of the outlet may vary with application. As an example, the outlets, suggestively in the form of a vent grid, could be arranged closer to the base of the housing, i.e. more remote from the inlet (to be described later), in order to increase convection. Also, the shape of the manifold 118 may vary, yet one design feature may be that it should pass as close as possible to heat-generating components of the camera assembly. Concentrating the cooling air flow such that it passes an area where the most heat is generated would be considered suitable. To the same point, heat-generating components may be arranged in direct physical contact with the heat dissipation portion 110, which is the case for the processor indicated at 124.

The cooling arrangement also comprises an inlet 126, and for the present embodiment the inlet is arranged in the center of the camera assembly, but more importantly it guides an airflow directly into the heat dissipation portion 110 and the channel 112 where it may serve its purpose of transporting heat away from the heat dissipation portion. The interior of the heat dissipation portion may also comprise cooling flanges 128, serving the purpose of increasing the contact area between the channel walls and the flow of air, in a per se known manner.

Figure 3:
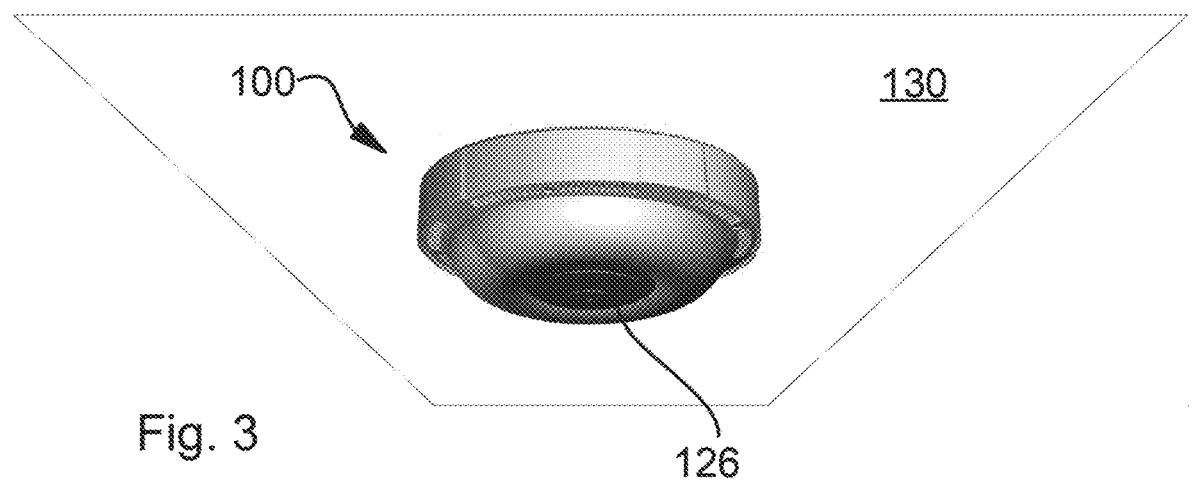
FIG. 3 is a perspective view of a camera assembly arranged in a ceiling.

Now, let us have a look at a use situation, where the camera assembly 100 is arranged in a ceiling 130, as shown in FIG. 3. As compared to the camera assembly as shown in FIGS. 1 and 2 it is now turned upside down, which is the expected use position. The bracket has been attached to the ceiling, and the chassis and the rest of the housing have been attached to the bracket. It is readily appreciated that the inlet will be a lower (not necessarily, but possibly, the lowest) point of the camera assembly in this use situation. As the camera heads and processors heat up, so will the heat dissipation portion. Next, the air inside the channel of the heat dissipation portion will heat up, and as a result it will start to transport upwards, as a result of convection. The stream of heated air will continue to the outlet of the camera assembly, and a continuous flow of air from the surroundings will enter through the inlet as a result. Heat will consequently be transferred from the heat-generating components, to the heat dissipation portion, to the air, and then be expelled from the camera assembly, which all in all results in an adequate cooling of the assembly. The flow described is illustrated in FIG. 2, yet the direction of the flow makes more sense knowing that the assembly is turned upside down in FIG. 2.

Figure 4:
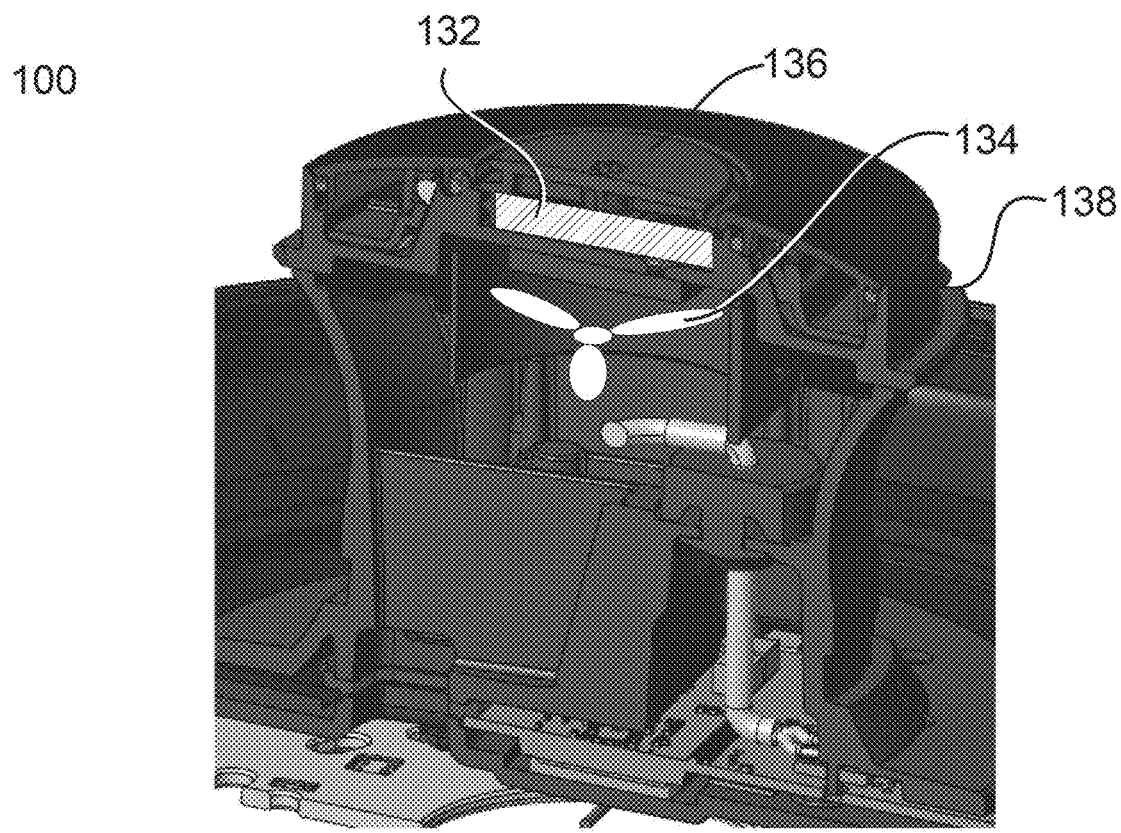
FIG. 4 is a detailed sectional view illustrating further details of the cooling arrangement

The channel 112 has no fluid communication with the camera compartment, and for that reason the qualities of the outside air is not critical for the functionality of the camera assembly. However, in an application where there, e.g., is a higher dust content in the surrounding air, a filter 132 may be arranged in the airflow through the channel. In one or more embodiments a filter may be arranged by removing a cap 136 of the inlet (with a screwdriver or by turning the cap manually), arranging a filter that fits in a filter holder, and putting the cap back on again. The filter should obviously have a shape that conforms to the portion of the channel in which it is arranged, which in the present case results in that the filter 132 will have a cylindrical shape, a sectional view of which is shown in FIG. 4.

In another embodiment, which may or may not be combined with the embodiment comprising the filter, a fan 134 may be arranged in the channel. The purpose of the fan is to increase the airflow and in that way to increase the heat transfer further. The fan is merely illustrated as a propeller in FIG. 4, and in a real embodiment the fan could be provided in the form of a duct fan that is insertable in the channel and which is powered from the power unit of the camera. The choice of fan may vary with several factors, such as the amount of power available and a desired cooling efficiency. Notably, apart from cooling, the fan could assist in maintaining the dome free from dust and debris, as mentioned in relation to the discussion about the outlets 122, or even be used to de-ice or dry the exterior of the dome by blowing the (now preheated) exhaust air over the exterior surface of the dome. In other installations the air used for cooling may be contaminated to the extent that it is preferable to direct the exhaust away from the dome, to decrease the deposition of grease and dirt, etc.

In order to access the fan, e.g., for service or inspection purposes, the upper (in FIG. 4) part 138 of the heat dissipation portion may be removable. This removable part may be held in place by means of screws or clamps, yet it may also be held in place by a pressure exerted by the dome 104. In an assembled state an inner diameter of the dome will abut an outer flange of the heat dissipation portion (with a seal arranged therebetween), which makes it possible for the dome to hold the removable part in place.

The camera assembly is shown as having a circular cross section, and this is presently a preferred embodiment. However, the cooling arrangement could obviously be used in camera assemblies having a different shape as well. Also, the cooling arrangement is placed in a center of the camera assembly, a location which is advantageous in the present embodiment, but which may not be as relevant for other embodiments.

It will be appreciated that a person skilled in the art can modify the above-described embodiments in many ways and still use the advantages of the teachings as shown in the embodiments above. As an example, the outlet or exhaust of the channel may be arranged on the lateral sides of the camera assembly, or even be directed back so as to exit in the center of the housing. If there is no ceiling above the bracket on which the camera assembly is arranged the outlet could even be placed on an upper side of the camera assembly, on the side opposite to where the inlet is positioned. Thus, the teachings should not be limited to the shown embodiments but should only be defined by the appended claims. Additionally, as the skilled person understands, the shown embodiments may be combined.

The invention claimed is:

1. A camera assembly comprising:
   a housing;
   a transparent dome;
   at least one camera head arranged inside the transparent dome; and
   a heat dissipation portion arranged inside the housing, wherein
   the heat dissipation portion forms a channel for cooling airflow, the channel extending through an inlet in the transparent dome,
   the heat dissipation portion is made from a material configured to transfer heat efficiently, and
   the heat dissipation portion constitutes a physical barrier between the channel and a compartment where the at least one camera head is arranged.

2. The camera assembly of claim 1, wherein the heat dissipation portion extends to a chassis of the housing.

3. The camera assembly of claim 2, wherein the channel extends to or through the chassis, and continues as a manifold extending outwards towards a perimeter of the housing.

4. The camera assembly of claim 2, wherein the chassis is made from a material configured to transfer heat efficiently.

5. The camera assembly of claim 1, wherein the heat dissipation portion comprises a fitting for a processing unit of the camera assembly.

6. The camera assembly of claim 1, wherein a fan is arranged in the heat dissipation portion in order to enhance the airflow.

7. The camera assembly of claim 1, wherein an inlet of the channel is arranged at a center of the camera assembly, and wherein an outlet of the channel is arranged at a perimeter of the assembly.

8. The camera assembly of claim 1, wherein an exchangeable filter unit is arranged at an inlet of the channel.

9. The camera assembly of claim 1, wherein an upper part of the heat dissipation portion, at an end of the heat dissipation portion extending through the transparent dome, is removable for access to an interior of the heat dissipation portion.

10. The camera assembly of claim 9, wherein the removable upper part of the heat dissipation portion comprises a cap below which the exchangeable filter is arranged.

11. The camera assembly of claim 9, wherein the removable upper part of the heat dissipation portion is held in place towards the rest of the heat dissipation portion with a pressure exerted by the transparent dome.

12. The camera assembly of claim 10, wherein the removable upper part of the heat dissipation portion is held in place towards the rest of the heat dissipation portion with a pressure exerted by the transparent dome.

13. The camera assembly of claim 1, wherein the least one camera head comprises a plurality of camera heads.

* * * * *